Jan. 16, 1951  F. E. OLDHAM  2,538,587
FLUID CONDUIT CONTROL AND THE LIKE SYSTEMS
Filed Jan. 7, 1949  2 Sheets-Sheet 1
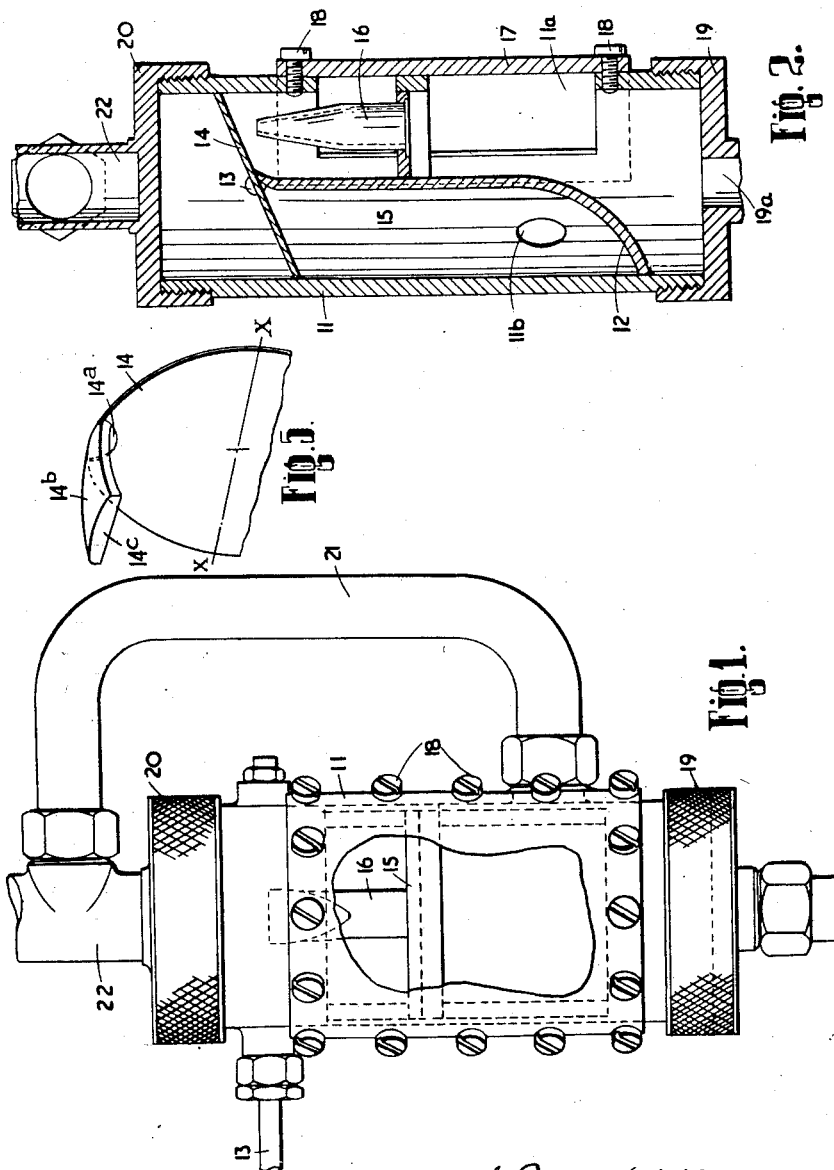
Frederick Edward Oldham INVENTOR.
BY
J. Victor Armstrong ATTORNEY

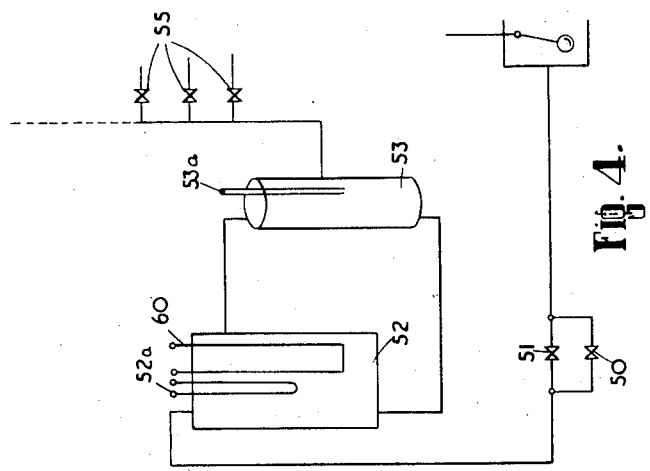
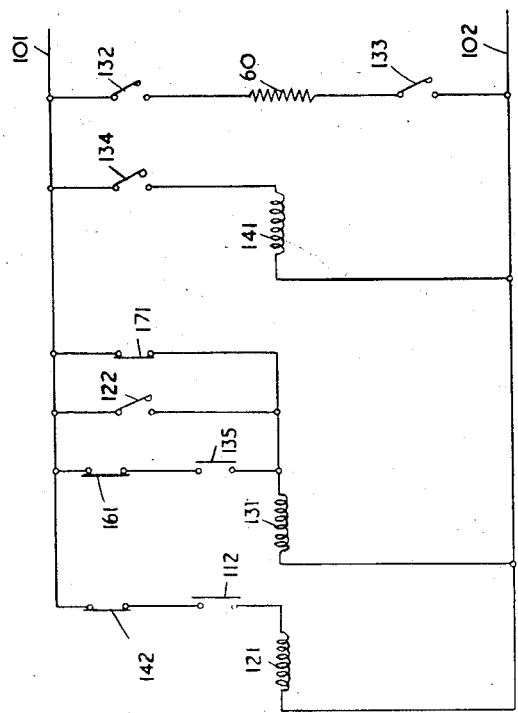

Patented Jan. 16, 1951

2,538,587

UNITED STATES PATENT OFFICE 2,538,587

FLUID CONDUIT CONTROL AND THE LIKE SYSTEMS

Frederick Edward Oldham, Mellor, near Blackburn, England

Application January 7, 1949, Serial No. 69,785
In Great Britain January 10, 1948

12 Claims. (Cl. 219—39)

The present invention relates to improvements in fluid conduit control and the like systems.

According to the present invention an element sensitive to the kinetic energy of flow of a fluid stream in a conduit operates through servo-motor means a variation (such as by opening or closing) in cross-sectional area of a second conduit for either the same or another fluid or a variation in heat energy supplied thereto.

The arrangement of this invention will for instance provide a greater overall efficiency in a water heating system under conditions where heated water is drawn off from the system in large quantities at irregular intervals.

In domestic water heating systems as fitted, for instance, to hotels or canteens, there is a high demand for hot water only at certain hours in the day, and at other times the whole water system is subject to heat loss, in spite of the fact that thermostatic control may be provided to the heating elements.

In the application of this invention to a control for a fluid supply to a water heating unit, the control will be operated to provide a greater heating capacity for the water heating element or boiler in the system, when water is being drawn off from the system whereas when the water in the system is static, or substantially so, that is to say when little or no water is being drawn off, the control will operate to cut out or reduce the heat energy applied to the water heating boiler or other element.

The heating energy may be applied by means of gas, solid fuel or oil, in which case the control may be effective on the quantity of fuel supplied, for instance by damper control, but usually it will be more convenient to provide electric immersion heaters as the heating elements, in which case the control may be effected by switch means in the electric energy supply system.

In a convenient form of control element a pivoted vane is disposed within a water chamber in the water pipe line, the displacement of which against a light spring or against gravity due to kinetic energy of water flow past it or impinging on it, closes an electric switch in the circuit of an electric immersion heater in a boiler or the like water heating unit, which may be remotely disposed therefrom. A water by-pass may conviently be arranged to the water chamber containing the pivoted vane, which by-pass is provided with a main water supply valve control means automatically operated, so that when the vane is displaced the valve in the by-pass is closed, and vice versa. Such valve may conven- iently be operated by a small electric motor placed in circuit on the operation of the electric immersion heater switch.

The chamber containing the vane may be divided into two portions by a diaphragm, one portion including a nozzle directing water against one-half of a butterfly vane, which then can flow against the other half of the butterfly vane which is disposed in the lower half of the chamber divided by the said diaphragm which has an outlet port behind said lower half of the butterfly vane leading to the outlet from the said chamber.

The water supply system may conveniently be provided with two groups of water heating elements, one of which may be capable, for instance, of raising the temperature of the water in the system or storage chamber to, let us say, 110° F., whilst the other is capable of raising the water in the system or storage chamber to 120° F., the latter being placed into circuit only whenever the said control switch above mentioned is closed by flow of water in the system, whilst the first group of electric immersion heater elements may be independently thermostatically controlled.

The invention will be further described by way of example with reference to the accompanying drawings which illustrate the application of the invention to the thermal control of a hot water installation and in which:

Fig. 1 is a view of a preferred form of valve with part of the cover broken away for clarity.

Fig. 2 is a section of Fig. 1.

Fig. 3 is a circuit diagram.

Fig. 4 is a diagrammatic layout of a hot water system.

Fig. 5 is a detail of a preferred form of pivoted vane.

A water valve (Figs. 1 and 2) includes a casing 11, a partition 12, a spindle 13, and a rotatable vane 14 secured to said spindle. Mounted between the wall of the casing 11 and the partition 12 is a platform 15 holding a nozzle 16. An aperture 11a in the casing 11 is closed by a cover 17 which is secured to the casing by screws 18. A cap 19 is threadedly engaged with the lower end of the casing, said cap having an aperture 19a therein by which water can enter the casing. The upper end of the casing 11 is blanked off by an upper cap 20, this upper cap being imperforate.

A connecting tube 21 connects an aperture 11b in the casing to a pipe 22 formed integral with the upper cap 20. Thus water entering the valve through the aperture in cap 19 passes upwardly through nozzle 16 and displaces the vane 14, thereafter passing downwardly over the other side of vane 14, passing through aperture 11b, along connecting tube 21 and thence to pipe 22. When vane 14 is displaced, rotation of spindle 13 causes closure of an electric circuit to be described later.

Referring now to Fig. 4. 50 is a control valve of the type described above, 51 is a valve adapted to be opened magnetically. 52 is a heating tank, and 53 a storage tank. Thermostats 52a, 53a are situated in tanks 52 and 53 respectively. Main heating elements 60 are situated in heating tank 52. Thermostat 52a is conveniently set to say 140° F., and thermostat 53a to a rather lower temperature, say 130° F. Taps 55 indicate where hot water is drawn off from the system.

In Fig. 3, contacts 112 are closed by operation of control valve 50. 101, 102 are supply leads, and thus closure of contacts 112 energises coil 121. Energisation of coil 121 closes contacts 122 of a time delay switch. Closure of contacts 122 energises coil 131. Energisation of coil 131 effects closure of main contacts 132, 133, 134 and auxiliary contact 135.

Closure of contacts 132, 133 brings heaters 60 into circuit.

Closure of contact 134 energises coil 141 which causes contact 142 to be broken, thus de-energising coil 121 which in turn causes contact 122 to be opened.

Coil 131 remains energised until the desired temperatures are reached in both the heating and storage tanks since thermostat contacts 161, 171 are in. Contacts 161, 171 relate to the thermostats 52 and 53 respectively. When these temperatures are attained coil 131 becomes deenergised, contacts 132, 133, 134 and 135 are broken, and the circuit is then back in its initial condition.

If the duration of the flow through valve 50 is less than the period preselected for operation of the time delay switch, then the pivoted vane returns to the closed position and contact 112 is taken out of circuit; thus the circuit is returned to its initial condition without the main contacts being closed and heaters 60 are not energised.

In Fig. 5 there is shown a detail of a preferred form of pivoted vane which is intended to facilitate the movement of the vane. In this construction the vane rotates about axis X—X and two diametrically opposite cut out zones 14a are provided in the regions of the vane remote from axis X—X. A pair of wind scoops 14b are provided, one for each of the cut out zones, these wind scoops lying on opposite sides of the plane of the vane, and having a flanged portion 14c intended to be impinged upon by the first flow of water through the valve.

I declare that what I claim is:

1. In a fluid heating system, a first conduit, a main valve in said first conduit, a second conduit, a vontrol valve in said second conduit, a displaceable element in said control valve sensitive to the flow of fluid, and a time-delayed servomotor means adapted to be operated by movement of the displaceable element in response to a flow of fluid, said servomotor means opening the main valve only after flow of fluid through the control valve has persisted for a predetermined time.

2. A fluid heating system as set forth in claim 1 in which the servomotor means comprises a suitable electric circuit including a time delay contact.

3. A fluid heating system as set forth in claim 1 in which the second conduit at its ends joins into the first conduit on opposite sides of the said main valve, thus constituting a by-pass for said main valve.

4. In a fluid heating system, a first conduit, a main valve in said first conduit, a second conduit, a control valve in said second conduit, a displaceable element in said control valve sensitive to the flow of fluid, and a time-delayed servomotor means adapted to be operated by movement of the displaceable element in response to a flow of fluid, said servomotor means serving to energise electric resistance heating elements only after flow of fluid through the control valve has persisted for a predetermined time.

5. A fluid heating system as set forth in claim 4 in which the second conduit at its ends joins into the first conduit on opposite sides of the said main valve, thus constituting a by-pass for said main valve.

6. A fluid heating system as set forth in claim 4 in which the servomotor means comprises a suitable electric circuit including a time delay contact.

7. A fluid heating system as set forth in claim 6 in which the electric circuit is so arranged that the heating elements remain energized even when flow through the control valve has ceased and the displaceable element has returned to its initial position, said heating elements only becoming de-energised when a predetermined temperature of the fluid has been obtained, the electric circuit including temperature responsive contacts which open at said predetermined temperature and thus deenergise the heating elements.

8. A fluid heating system comprising a storage tank, a heating tank, heating elements in both said tanks, a first conduit for supplying fluid to the heating tank, a main valve in the first conduit, a second conduit by-passing the main valve, a control valve in the second conduit, a displaceable element in the control valve sensitive to flow of fluid and an electric circuit adapted to be closed by movement of the displaceable element in response to a flow of fluid, closure of said electric circuit initiating, through time delayed means, the opening of the main valve and the energisation of the heating elements.

9. A fluid heating system as set forth in claim 8 in which the electric circuit is such that the heating elements remain energised even after the displaceable element has returned to its initial position, said heating elements only becoming de-energised when temperature sensitive contacts open on the attainment of predetermined temperatures in the heating tank and storage tank.

10. A fluid heating system as set forth in claim 9 in which the predetermined temperature relating to the storage tank is less than that relating to the heating tank.

11. A control valve for a fluid heating system comprising a casing, a partition dividing said casing in a generally lengthwise direction into a first chamber and a second chamber, said partition stopping short of one end of the casing to provide a communication between said first and second chambers, a vane pivoted in a central region about an axis adjacent the end of the partition so shaped that in one position it engages the casing walls and separates the first and second chambers, a fluid inlet for the first chamber, a nozzle in the first chamber through which the fluid must pass and orientated so as to direct the fluid on to one part of the vane and deflect said vane from the closed position, and a fluid outlet in the second chamber, the said fluid inlet and outlet being so positioned that fluid must pass across one face of the vane in leaving the first chamber and across the other face of the vane in entering the second chamber.

12. A control valve as set forth in claim 11 in which the pivoted vane is spring biased to remain in the closed position when there is no flow through the valve.

FREDERICK EDWARD OLDHAM.

REFERENCES CITED

The following references are of record in the file of this patent:

UNITED STATES PATENTS

| Number | Name | Date |
|---|---|---|
| 1,051,979 | Appleton | Feb. 4, 1913 |
| 1,214,757 | Clark | Feb. 6, 1917 |
| 1,351,779 | Mather | Sept. 7, 1920 |
| 1,512,405 | Carlson | Oct. 21, 1924 |
| 1,555,338 | Vaughan | Sept. 29, 1925 |
| 1,847,198 | Torrisi | Mar. 1, 1932 |
| 2,419,429 | Voiles | Apr. 22, 1947 |